US005614883A

United States Patent [19]

Dery et al.

[11] Patent Number: 5,614,883

[45] Date of Patent: Mar. 25, 1997

[54] AUTOMOTIVE OPTO-ELECTRIC STARTER INTERLOCK

[75] Inventors: Normand Dery, Sherbrooke; Guy Santerre, St-Elie d'Orford; Alain Jean, Sherbrooke, all of Canada

[73] Assignee: Astroflex, Inc., Quebec, Canada

[21] Appl. No.: 367,799

[22] Filed: Dec. 30, 1994

[30] Foreign Application Priority Data

Dec. 23, 1994 [CA] Canada .................................. 2139073

[51] Int. Cl.[6] .................................................. B60Q 11/00

[52] U.S. Cl. ......................... 340/458; 340/686; 340/687; 340/531; 200/61.28; 200/61.88; 307/10.1; 307/10.6; 361/171; 361/172; 250/491.1; 180/287

[58] Field of Search .................................... 340/458, 555, 340/556, 686, 687, 531, 61.28; 200/61.28, 61.85, 61.88, 61.91; 307/9.1–10.1; 361/171, 172; 250/491.1

[56] References Cited

U.S. PATENT DOCUMENTS 4,825,210 4/1989 Bachhuber et al. ............... 340/825.31

*Primary Examiner*—Jeffery Hofsass
*Assistant Examiner*—Daryl C. Pope
*Attorney, Agent, or Firm*—Ratner & Prestia

[57] ABSTRACT

An automotive opto-electric starter interlock for use in a motor vehicle for the purpose of preventing the engine from being remotely started unless the transmission is in neutral. The starter interlock includes an optical sensors array mounted to the transmission shift linkage. The output of the sensors is dependent upon the position of the shift linkage, hence allowing to determine if the transmission is in neutral. A microprocessor stimulates the sensors and observes their response to determine the position of the shift linkage. The information supplied by the sensors is also used to detect system malfunctions.

38 Claims, 8 Drawing Sheets

AUTOMOTIVE OPTO-ELECTRIC STARTER INTERLOCK

FIELD OF THE INVENTION

The invention relates to an automotive opto-electric starter interlock preventing the engine of a vehicle from being remotely started unless the transmission is in neutral.

BACKGROUND OF THE INVENTION

Manufacturers of cars or trucks having automatic transmissions are required to install a so called park/neutral switch in the vehicle which prevents the operation of the starter motor when the transmission is in driving engagement with the wheels. Typically the switch is connected to the shift linkage of the transmission. When the transmission is shifted in PARK or NEUTRAL the switch allows the engine to be cranked by closing the electric circuit of the starter motor. In any other transmission mode the switch assumes an open condition preventing the starter motor from being energized.

After market remote vehicle starting systems that function by way of radio link are designed to interface with the park/neutral switch in order to determine if the transmission is in a mode allowing the engine to be remotely started in a safe manner. Typically, the slave controller of the starting system which is mounted on board the vehicle observes the state of conduction of the park/neutral switch, upon reception of a radio transmission signalling to start the engine. The slave controller will implement the start engine command only if the park/neutral switch is closed.

However, most cars or trucks having a manual transmission have no factory installed device allowing to determine whether the transmission is in neutral or in gear. In an attempt to overcome this limitation manufacturers of remote vehicle starting systems have developed simple electromechanical switches coupled to the shift linkage of the transmission. This approach is satisfactory when the switch is new. However, the protection it offers against remote starting with the transmission in gear is compromised over time because the switch may eventually malfunction as a result of normal wear or simply lack of proper adjustment. In view of the serious consequences which could result from remote starting of a motor vehicle with the transmission is gear, the industry is presently trying to develop a fail safe device that would positively prevent the engine from starting unless the transmission is, in fact, in the neutral position (or park, if available).

OBJECTIVES AND SUMMARY OF THE INVENTION

An object of the present invention is a starter interlock for use with a remote vehicle starting system which affords a greater degree of safety and reliability against malfunction than prior electromechanical systems.

A further object of the invention is to provide a starter interlock which can easily be installed as an after market device to the vast majority of passenger cars and trucks with the minimum requirement of installation time.

As embodied and broadly described herein the invention provides an opto-electric interlock to prevent remote starting of a motor vehicle when a transmission of the vehicle establishes a driving relationship between an engine of the vehicle and a wheel thereof, said opto-electric interlock comprising:

a light source for supplying radiant energy;

a light detector responsive to radiant energy incoming from said light source, said light source and said light detector assuming a state of optical coupling in response to movement of a shift linkage of the transmission of the vehicle to a spacial position in which the driving relationship between the engine of the vehicle and the wheel thereof is terminated, whereby an output condition of said light detector enables to determine whether the transmission of the vehicle is in gear;

a processing unit controlling actuation of said light source, said processing unit being responsive to the output condition of said light detector in order to assume either one of a start enable state and a starter disable state, in said start enable state said processing unit enabling remote actuation of a starter motor of the vehicle, in said starter disable state said processing unit precluding remote actuation of the starter motor, whereby said processing unit is capable of switching between said start enable state and said starter disable state in dependence of a spacial position of the shift linkage, said processing unit including diagnosis means for sensing detectable malfunctions in said opto-electric interlock, said diagnosis means including:

a) an excitation unit for actuating said light source in a predetermined manner;

b) means for observing the output condition of said light detector;

c) a comparing unit for comparing the output condition of said light detector observed at step b) with a response characteristic of the opto-electric interlock in an unimpaired operative condition, upon absence of agreement between the output condition at step b) and said response, said processing unit assuming said starter disable state in order to preclude remote actuation of the starter motor of the vehicle.

For the purpose of this specification:

a) the expression "motor vehicle" refers to cars, trucks, busses, farm tractors, road tractors, industrial tractors and generally any land vehicle powered by an internal combustion engine and to which a remote starter may be advantageously installed;

b) the expression "remote starting system" designates an electronic device installed in a motor vehicle which enables starting of the engine with a remote control while the vehicle is unattended. An example of a remote starting system which has been commercialized in recent years, especially in Eastern Canada, is a unit manufactured by Astroflex Inc., St-Elie d'Orford, Quebec, Canada, model RS-404, for use in passenger cars equipped with an automatic transmission. Remote starters are used in motor vehicles of the types used as passenger cars and trucks; and c) the expression "shift linkage" refers to the assembly of mechanical members constituting the agency to manually operate the transmission of a vehicle. Typically the shift linkage includes a gear shift, also called gear selector, and the rods, cables or links coupling the gear shift to the transmission.

The opto-electric starter interlock in accordance with the invention offers a significant improvement in terms of reliability and safety over prior art electromechanical switches because it has the ability to detect a malfunction in the optical system provided to sense the position of the transmission shift linkage. Should a detectable malfunction occur, the processing circuit automatically defaults to a safer state which is the starter disable condition that prevents the starter motor from being actuated.

Preferably, the light source is mounted on the gear shift lever of the transmission while the light detector is fixed on the transmission tunnel forming part of the floor pan of the vehicle. The light source is within the field of view of the light detector, hence an optical coupling is established between the pair source/detector, only when the gear shift lever is in the neutral position. In any other gear shift lever position the pair source/detector are out of alignment effectively discontinuing the optical coupling.

The processing unit runs a diagnostic routine by triggering the light source to generate light bursts in accordance with a predetermined sequence and by monitoring the dynamic response of the light detector. If the response pattern mirrors the light source excitation pattern the starter interlock is considered functionally sound. Dynamic testing of the pair source/detector is considered a far better integrity check than a simple static measurement, such as triggering the light source to fire a one-shot burst and observing the detector for a response. A malfunctioning detector that continuously outputs a high signal (normally indicative of light detection) may pass a rudimentary static test since it provides the appearance of some output activity, but will fail a dynamic check which verifies both operative states of the detector, namely the presence of output activity and the absence of output activity. Under a preferred embodiment the sequence of actuation of the light source includes at least one change of light emission state, such as turning the light source on for a brief moment and then off, that occurs at a predetermined instant in time.

It will be apparent that the results of the diagnostic check also serve the purpose of determining if the shift linkage of the transmission is in a position suitable for enabling the starter motor to operate. For instance, a discrepancy between the response of the light detector and the excitation of the light source is caused either by a system malfunction or by the absence of optical coupling between the pair source/detector (occurring when the shift linkage is in a non-neutral position). The processing unit does not perform an analysis in order to discern which one of the two conditions is the cause of the discrepancy. Rather, it defaults to the starter disable state since in either case the starter motor should not be allowed to operate.

In a most preferred embodiment the starter interlock in accordance with the invention includes two optical pairs source/detector, the elements of each pair being oriented according to independent alignment axes. The alignment condition, hence optical coupling, on both axes occurs only when the gear shift lever is in the neutral position. The use of two pairs of optical elements allows to use a more sophisticated dynamic diagnostic routine given the increased number of optical elements permutations. For instance, the preferred diagnostic routine comprises the following four steps:

a) firing the first light source and observing the output of both detectors; a signal should appear only at the detector output associated with the first light source;

b) firing the second light source and observing the output of both detectors; a signal should appear only at the detector output associated with the second light source;

c) firing simultaneously both light sources; a signal should be present simultaneously at both detector outputs; and d) there should be no signal at any one of the detectors outputs when the light sources have not been actuated.

The processing unit is operated by a program cumulating the results of the four step test described above in order to make a decision as to whether the starter motor of the engine should be enabled. More particulary, the four step diagnostic test is invoked during the execution cycle of the main program and the results of the probing are compared against a criterion which changes in dependence upon the current operative condition of the starter motor of the vehicle. In one embodiment, the processing unit keeps a historical record of the results returned by the last three diagnostic routine calls. The historical record can be assimilated to a balance sheet of credits and debits. At every successful diagnostic routine run the number of credits is incremented by one. Conversely, a failed diagnostic routine decrements the number of credits by one. A diagnostic routine is considered passed when each of the four verifications steps returns a no error condition. The opto-electric interlock will:

a) switch from the starter disable state to the start enable state when three (3) credits have been accumulated;

b) switch from the start enable state to the starter disable state when the number of credits has been reduced to zero (0); and c) effect no change of operative state if the number of credits is one (1) or two (2).

Since the program is continuously running the system status is being updated at every diagnostic routine pass. In the event of a hard failure of one element of a pair light source/detector, the program will never reach the requisite number of credits and the starter interlock will permanently remain in the starter disable state.

When the starter motor is being energized the opto-electric interlock retains the ability of terminating the operation of the starter motor at any time should the optical elements pairs fail the diagnostic test a predetermined number of times. Unlike the rigorous testing enforced when the starter motor is inoperative, the processing unit relaxes the test criterion to account for vibrations in the shift linkage induced by the engine cranking that may temporarily misalign the elements of the pairs light source/detector. This is accomplished by expanding the historical record to include in the balance sheet the results of the last five (5) calls to the diagnostic routine. As a consequence, the number of consecutive diagnostic routine run failures required for causing the system to switch from the start enable state to the starter disable state increases from three to five, thus allowing a margin for error.

In a preferred embodiment, the light source of the optical pair source/detector is a light emitting diode (LED) producing light in the infrared range of the spectrum. The companion detector is a phototransistor. One element of each optical pair source/detector is secured to the gear shift lever for movement therewith. The companion elements are mounted on the floor pan in the vicinity of the gear shift lever. The relative angular positions of the elements in each optical pair source/detector are such as to locate the source within the field of view of the detector when the gear shift lever is in the neutral position. The light source is recessed into a housing which defines an elongated light passage so dimensioned as to allow only a narrow beam of light to emerge from the housing. Internal grooves extending, generally transversely to the light passage axis reduce reflections on the passage walls, thereby maintaining the beam narrow and tightly focussed. The internal grooves may be helical screw threads which could also serve the additional function of retaining an aligning tool.

The housing holding the optical element is provided with a transverse aperture and is retained by a bolt which extends through the aperture and through a mounting block strapped to the gear shift lever. Each mounting block has, on one side, a central boss and two opposite shoulders defining tie wraps receiving grooves. On the opposite side, each mounting block has a transversally concave surface shaped to conform to the gear shift lever cylindrical outer surface. The boss has a bolt receiving aperture which extends through the boss and terminates with a nut recess opening in the back surface to receive and restrain against rotation the nut of the bolt. The back surface of each mounting block is, preferably, at least partially covered with a thin layer of suitable adhesive to increase resistance against accidental displacement of the mounting block relative to the gear shift lever. The adhesive may be deposited during manufacturing and protected with a peel-off film which is removed immediately prior to installation. Two tie wraps straddling the mounting blocks hold the assembly against the gear shift lever.

Each element of an optical pair source/detector, whether mounted to the gear shift lever or secured to the floor pan is mounted in an individual housings of the type mentioned above. The housing is made of a suitable rigid material such as plastic which is opaque to light within the working wavelength range of the elements. The hollow housing may be made of two symmetrical halves meeting along a median plane which extends longitudinally and centrally through the housing and through the light passage.

As embodied and broadly described herein, the invention also provides an interlock to prevent remote starting of a motor vehicle when a transmission of the vehicle establishes a driving relationship between an engine of the vehicle and a wheel thereof, said interlock comprising:

first sensor means responsive to movement of a shift linkage of the transmission, whereby an output condition of said sensor means allows to determine if the transmission of the vehicle is in gear;

second sensor means responsive to an operative condition of a parking brake of the vehicle, whereby an output condition of said second sensor means enables to determine whether the parking brake is released or applied;

a processing unit coupled to said first and second sensor means, said processing unit being capable of assuming either one of a start enable state and a starter disable state in dependence upon the output conditions of said first and second sensor means, in said start enable state said processing unit enabling remote actuation of a starter motor of the vehicle, in said starter disable state said processing unit precluding remote actuation of the starter motor, said processing unit including memory means for storing data representative of the output condition of said first sensor means when the output condition of said second sensor means indicates that the parking brake is released, said processing unit assuming said start enable state in response to:

a) a current output condition of said second sensor means indicates that the parking brake is applied;

b) a current output condition of said first sensor means indicates that the driving relationship between the engine of the vehicle and the wheel thereof is terminated; and c) a contents of said memory means indicates occurrence of a driving relationship between the engine of the vehicle and the wheel thereof.

In a preferred embodiment the second sensor means is a electromechanical switch whose state of conduction changes upon the position of the parking brake, namely released or applied. The starter interlock can assume the start enable condition only when the parking brake switch signals that the parking brake is being applied. As a further measure of protection, the processing unit will historically correlate the state of conduction of the parking brake switch with the results of the diagnostic routine. If no changes in the gear shift linkage position have been observed subsequent the time the parking brake acquired the released position, the processing unit declares a possible system malfunction and the interlock fails to assume the start enable state even though all the other safety verifications have been met.

In a most preferred embodiment the starter interlock in accordance with the invention interfaces with the slave controller of the remote starting system in order to enable or disable the starter motor depending upon the decision taken by the processing unit. Upon reception of an RF (radio frequency) signal to start the engine, the slave controller will monitor the state of the starter interlock and it will actuate the ignition system of the vehicle and energize the starter motor only if the interlock assumes and maintains the start enable condition. It should be appreciated, however, that the starter interlock under the present inventive concept can be constructed as a stand alone unit that disables the starter motor by directly opening a relay or any other power switch in the starter energization circuit, without interfacing with the slave controller of the remote starting system.

Advantageously, the starter interlock also comprises an input observing the operative state of the ignition system of the engine. As a further measure protection a protection relay is provided which prevents operation of the remote starting system when the signal at the ignition input indicates that the ignition system is activated in spite of the fact that the interlock is in the starter disable condition.

As embodied and broadly described herein, the invention also provides an opto-electric interlock to prevent remote starting of a motor vehicle when a transmission of the vehicle establishes a driving relationship between an engine of the vehicle and a wheel thereof, said opto-electric interlock comprising:

a light source for supplying radiant energy;

a light detector responsive to radiant energy incoming from said light source, said light source and said light detector assuming a state of optical coupling in response to movement of a shift linkage of the transmission of the vehicle to a spacial position in which the driving relationship between the engine of the vehicle and the wheel thereof is terminated, whereby an output condition of said light detector enables to determine whether the transmission of the vehicle is in gear;

a processing unit controlling actuation of said light source, said processing unit including an excitation unit for causing said light source to assume a sequence of operative states at predetermined instants in time, a first of said operative states corresponding to actuation of said light source to cause said light source to emit radiant energy during a first time interval, a second of said operative states corresponding to de-actuation of said light source, whereby said light source generates no radiant energy during a second time interval, said processing unit being responsive to the output condition of said light detector in order to assume either one of a start enable state and a starter disable state, in said start enable state said processing unit enabling remote actuation of a starter motor of the vehicle, in said starter disable state said processing unit precluding remote actuation of the starter motor, whereby said processing unit is capable of switching between said start enable state and said starter disable state in dependence of a spacial position of the shift linkage, said processing unit assuming said start enable state when said light detector manifests:

a) an output condition during said first time interval indicative of presence of radiant energy; and b) an output condition during said second time interval indicative of absence of radiant energy.

As embodied and broadly described herein the invention further provides a group of opto-electric components for detecting a position of a gear shift lever in a motor vehicle, said group of opto-electric components comprising:

a light source element for generating radiant energy;

a light detector element responsive to the radiant energy emitted by said light source element, said light source element and said light detector element being mounted in respective housings, a first one of said housings being capable of engaging the gear shift lever, whereby movement of the gear shift lever causes movement of said first housing and the element mounted therein, a second one of said housings being adapted for mounting to a location adjacent the gear shift lever, whereby movement of the gear shift lever causes a relative movement between said light source element and said light detector element, said light source element and said light detector elements being capable of assuming a state of optical coupling when the gear shift lever is in a predetermined position in which said light source element generates light within a field of view of said light detector element, in said state of optical coupling said light detector element manifesting an output condition indicative of presence of radiant energy which signals that the gear shift lever is in the predetermined position.

BRIEF DESCRIPTION OF THE DRAWINGS

In the accompanying drawings which illustrate a preferred embodiment of the present invention.

Figure 9:
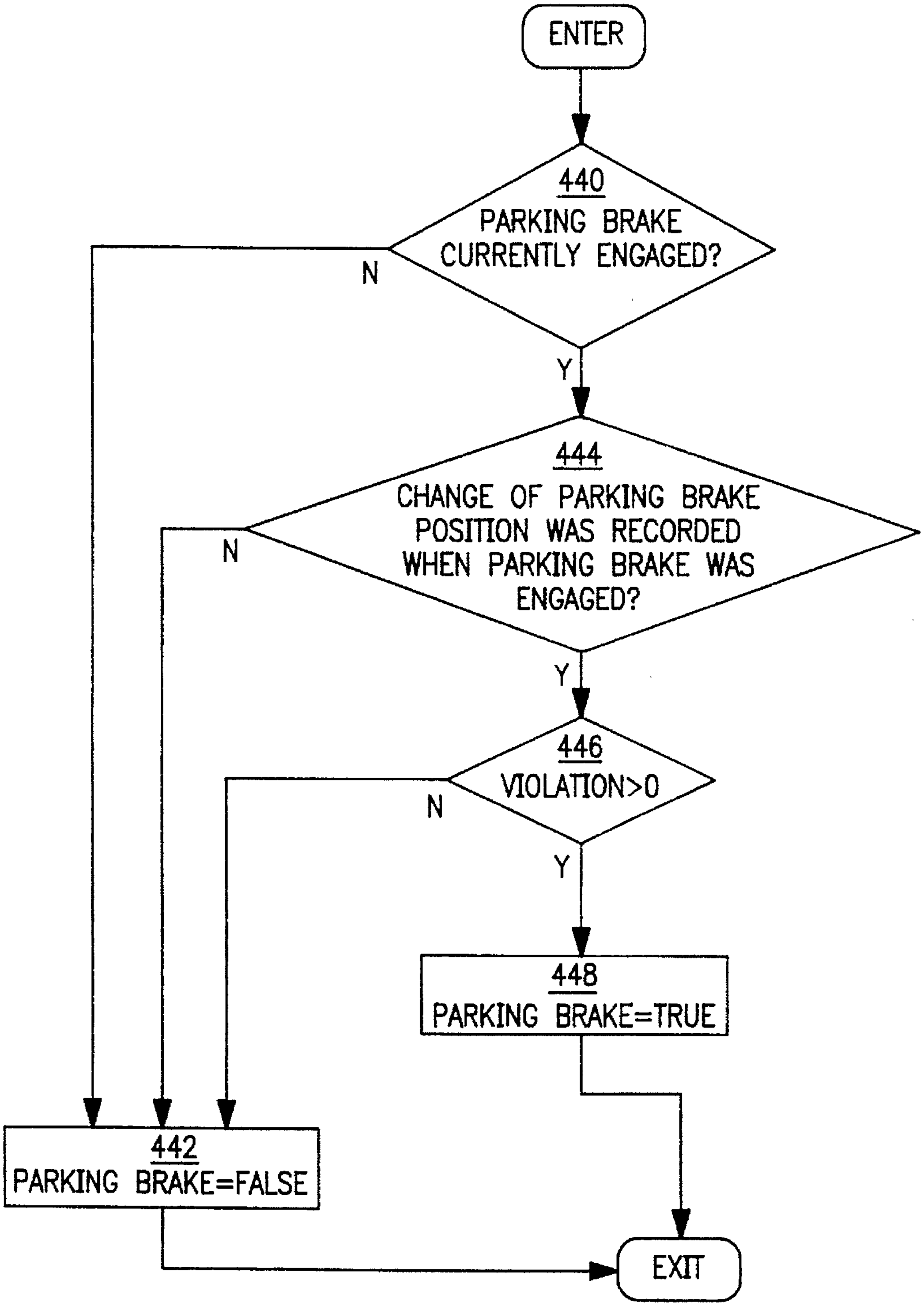
Figure 10:
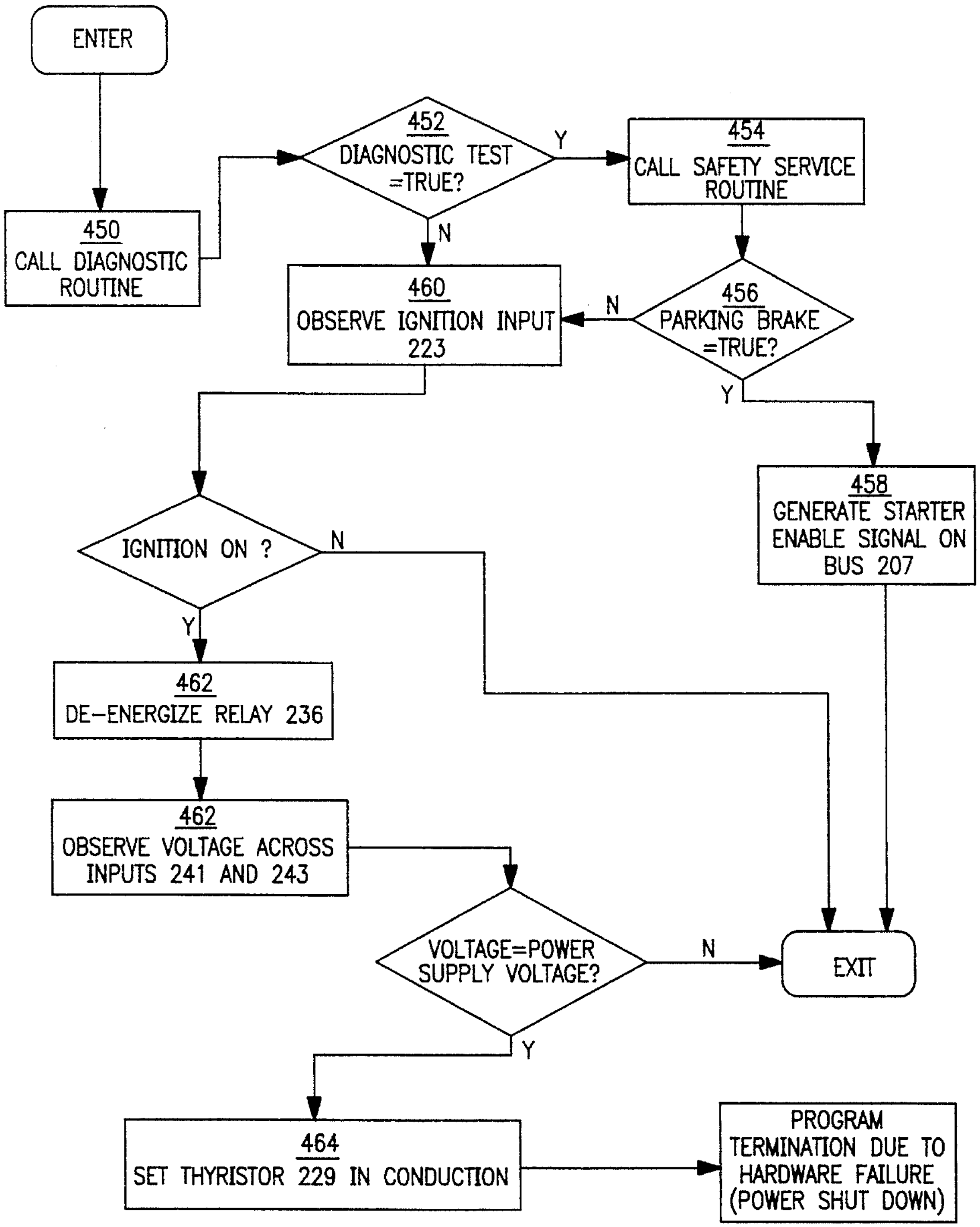

FIGS. **8*a* and 8*b*** are flowcharts of the diagnostic routine performed by the processing unit to determine whether the gear shift lever is in the neutral position;

FIG. 9 is a flowchart of a safety service routine performed by the processing unit to check the current status of the parking brake and the historical record of the parking brake positions; and FIG. 10 is a flowchart of the main program directing the operation of the processing unit of the starter interlock.

DESCRIPTION OF A PREFERRED EMBODIMENT

Remote starters currently marketed usually comprise a micro-controller which actuates various relays to activate the ignition, energize the starter motor and close the circuits of various accessories such as heating, air conditioning, alarm, door locks, etc. Before authorizing remote starting, the micro-controller determines if the transmission of the motor vehicle is in the park or neutral position. If it is not, remote starting must be prevented. Cars and trucks equipped with an automatic transmission are generally provided with a reliable factory-installed park/neutral switch. However, such is not the case with respect to most cars and trucks equipped with manual transmission. The present invention provides an opto-electric starter interlock for use in association with a remote starter in a motor vehicle provided with a manual transmission. The opto-electric interlock acts as a complement to remote starters currently available on the market when it is desired to install same in a manual transmission motor vehicle. It constantly provides the remote starter with information regarding the position of the gear shift lever and of other elements, as may be required, such as for example the parking brake, and it monitors its own proper functioning.

Figure 1:
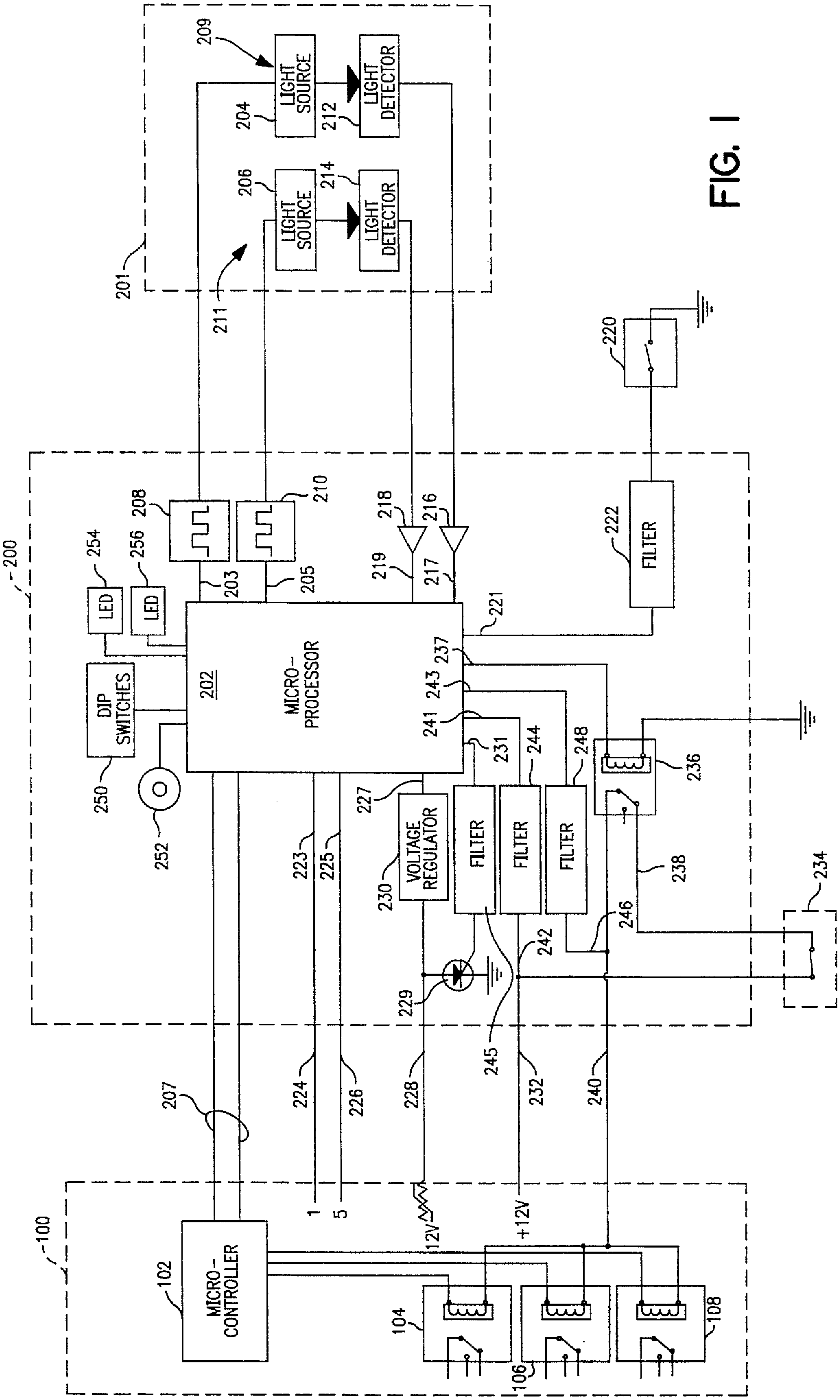
FIG. 1 is a block diagram of an opto-electric starter interlock in accordance with the present invention interfacing with a remote starting system.

FIG. 1 is a generalized block diagram of a remote starter system identified comprehensively by the reference numeral 100. The principal components of the remote starting system 100 are a micro-controller 102, and a series of relays 104, 106 and 108 that control the state of conduction of various circuits of the vehicle such as ignition, starter motor, fuel injection, accessories, etc., in response to signals generated by the micro-controller 102. Only three relays are shown but, in practice, more than three will be used. A dash mounted main switch, 234, connected in series with the electrical power supply circuit 240 of relays 104, 106 and 108 enables the user to manually de-activate the remote starting system 100 when desired. An example of a remote starting system described above that is currently available on the market is the Astroflex remote starter, model RS-404 manufactured and sold by Astroflex Inc., St-Elie d'Orford, Quebec, Canada.

The remote starting system 100 interfaces with an opto-electric starter interlock 200 that senses the position of the transmission gear shift lever and of the parking brake. Based upon information generated by a plurality of sensors, the interlock 200 appraises through software analysis the supplied data to determine if the engine of the motor vehicle can be safely started. The decision of the interlock 200 is communicated to the micro-controller 102 through a communication channel 207. If the starter interlock 200 determines that all the conditions allowing to safely start the engine have been complied with it assumes a start enable operative mode that is manifested by the presence of a signal on the communication channel 207. In the starter disable operative mode no signal is present on the channel 207 which precludes any engine from being cranked. The starter interlock 200 comprises a programable signal processing unit based on a micro-processor 202 (the MICROCHIP PIC device sold under the commercial designation of 16C57HS has been found satisfactory). The operation of the micro-processor 202 is directed by a program stored in the memory of the device. The program is executed without interruption in order to supply the micro-controller 102 with continuously updated information on the operative status of the interlock 200 (start enable state or starter disable state).

The micro-processor 202 receives information on the position of the shift linkage from an optical sensors array 201 that includes a pair of light sources 204 and 206 and companion light detectors 212 and 214. The light sources 204 and 206 are light emitting diodes (LED) operating in the infrared range of the spectrum (devices manufactured and commercialized by OPTEK under the commercial designation OP 298 have been found satisfactory). The light detectors 212 and 214 are preferably phototransistors responsive to infrared radiation (the OPTEK phototransistor sold under the commercial designation OP 598 is acceptable).

The micro-processor 202 has dedicated outputs 203 and 205 for controlling the operation of the light sources 206 and 204, respectively. The signals impressed on the outputs 203 and 205 are supplied to drivers 208 and 210. The drivers 208 and 210 are essentially amplifiers producing modulated signals at a sufficient power level to excite the light sources 206 and 204.

The outputs of light detectors 212 and 214 are connected to inputs 217 and 219, respectively of the micro-processor 202 through amplifiers 216 and 218 wired in a comparator configuration. It will be apparent that when the output of a light detector exceeds the reference voltage of the associated comparator, the output of the comparator switches to high level signalling the micro-processor that the light detector has observed infrared radiation.

As will be described in greater detail below, each optical pair source/detector 209 and 211 has one of its elements mounted to the intermediate portion of the gear shift lever while the companion element is mounted to the floor pan of the motor vehicle, near the base of the gear shift lever. The angular position of the elements of each optical pair source/detector is such that when the gear shift lever is in the park or neutral position, radiation generated by the light source 204 will be detected by companion detector 212 which will, therefore, manifest an electrical output. This will cause a signal to appear at input 217. Since the light source 204 radiates energy outside the field of view of detector 214, the latter manifests no output. Likewise, light produced by light source 206 will be detected only by the associated light detector 214 to produce a signal at input 219. Moreover, when the gear shift lever is in any other position, i.e. in gear, neither light detector 214, 212 can sense infrared light from either sources 204 and 206 and no signal will appear at inputs 217 and 219.

The micro processor 202 monitors the position of the parking brake via switch 220 found in most modern motor vehicles. The normal function of the switch 220 is to energize a pilot light on the instrument panel of the vehicle informing the driver that the handbrake is applied. A filter circuit 222 is connected between parking brake input 221 and switch 220.

The micro-processor 202 also includes an ignition input 223 observing the ignition circuit of the motor vehicle (not shown) via conductor 224 in order to determine whether the ignition system is energized. In addition the micro-processor 202 also has a starter input 225 connected to the starter energizing circuit via conductor 226 to determine whether the engine of the motor vehicle is being cranked.

An input 227 of the micro-processor is connected through a voltage regulator 230 to the power source of the remote starting system 100 via conductor 228. This power source is protected against short circuits by a suitable fuse or electronic breaker in accordance with established circuit protection practices. Under some particular circumstances the micro-processor 202 will short circuit to ground the power line 228 to blow the protection fuse or open the breaker, thus depriving the remote starting system of electric energy in order to positively terminate its operation. Short circuiting the power line is implemented by a thyristor 229 connected between conductor 228 and ground. An output 231 of the micro-processor is connected to the gate of the thyristor 229 via a suitable filtering circuit 245.

The micro-processor 202 controls the power flow on line 232 that supplies electrical energy to the windings of relays 104, 106 and 108, through normally opened relay 236 which is maintained in a state of conduction by continuously energized relay output 237. Information as to the presence of voltage on line 232 is supplied to micro-processor 202 via inputs 241 and 243, through filtering circuits 244 and 248, respectively. More specifically, the input 241 observes the source side (battery) of main switch 234, while the input 243 monitors the load side of the main switch 234 (the windings of relays 104, 106 and 108). As it will be described in detail later, the micro-processor 202 can de-energize relay 236, thus preventing operation of the relays 104, 106 and 108 when a malfunction is sensed.

Micro-processor 202 comprises a dip switch board 250 provided for selecting certain functions such as the polarity of the parking brake switch 220, among others during the installation of the unit. A buzzer 252 and a pair of pilot lights 254 and 256 are also provided for facilitating the adjustment of the electrical sensors array 201.

Figure 2:
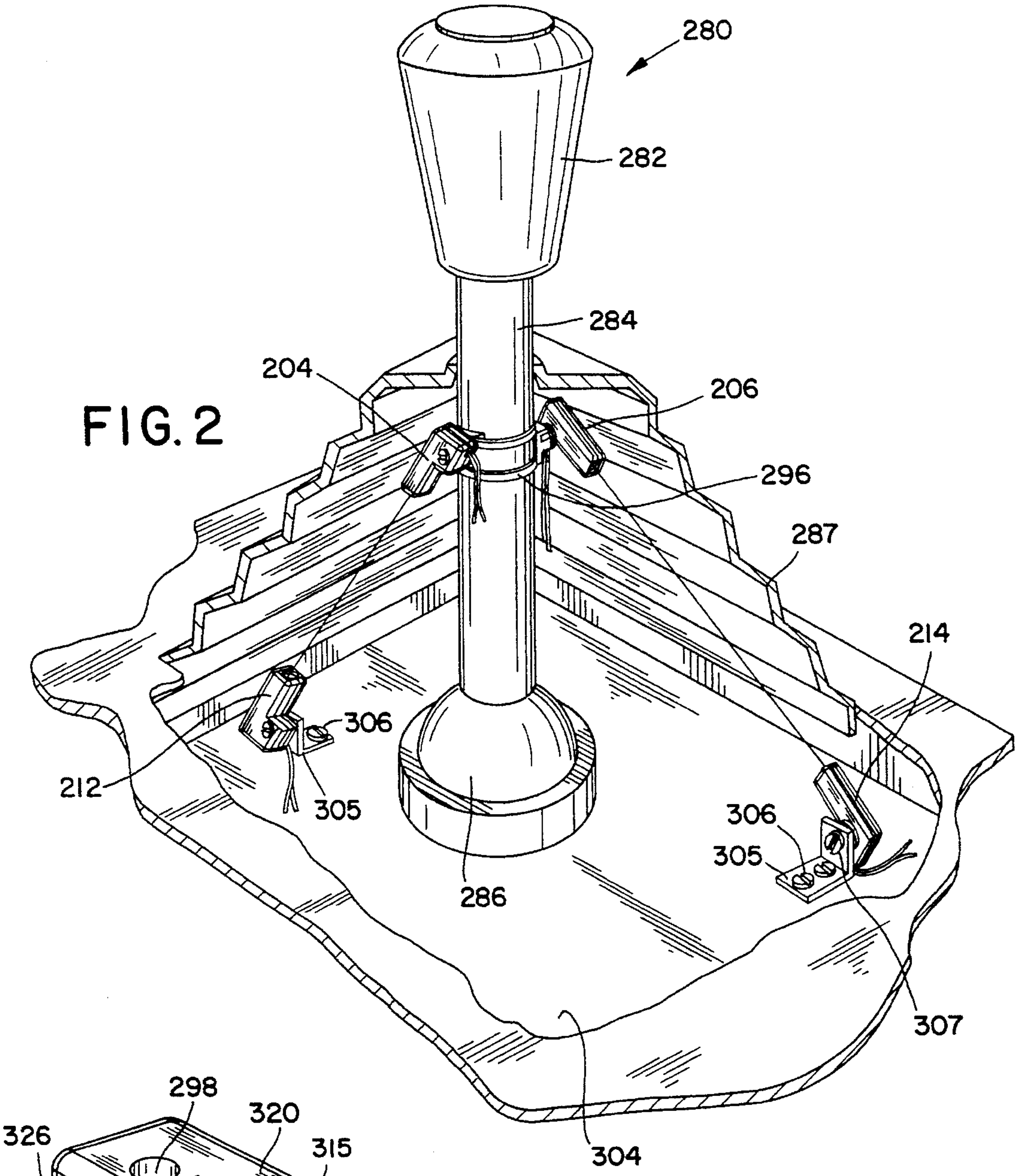
FIG. 2 is a perspective view, with parts broken away showing a gear shift lever to which are mounted two optical pairs source/detector of the starter interlock in accordance with the present invention.

The structure of the electrical sensors array 201 and its relationship with the shift linkage of the transmission will now be described in connection with FIGS. 2 to 6. In FIG. 2, the gear shift lever 280 having a knob 282 and a lever 284 is pivotally mounted at 286 to the floor pan 304 of the vehicle. The lower portion of the gear shift lever 284 is enclosed within a leather or rubber boot 287 that is shown with sections broken away in order to facilitate the illustration of the internal components. The optical elements 204 and 206 are secured to the intermediate portion of the gear shift lever by means of a pair of tie wraps 296 made of plastic or any other suitable material. As better illustrated in FIG. 3, each optical element 204 and 206 is retained to gear shift lever 284 by means of a mounting block 288 strapped to the gear shift lever by the tie wraps 296 and to this effect each mounting block 288 has a central boss 289 and two opposite shoulders defining tie wrap receiving arcuate grooves 290 and 291. The back surface 292 of each mounting block is transversely concave and is shaped to fit on the outer surface of a typical gear shift lever. Preferably, the arcuate back 292 of each mounting block is provided with a thin layer of adhesive which increases resistance against accidental displacement relative to the gear shift lever 284. The adhesive (not shown) may cover only part of surface 292 or the entire surface. It is preferably factory installed and protected by a suitable peel-off film so as to remain suitably tacky until installation. The central boss 289 of each mounting block 288 is provided with an aperture 293 which extends through the boss and terminates with a nut recess 294 for receiving and restraining against rotation a knot 295.

Each optical element 204 and 206 is mounted in a suitable rigid housing 310 having a transversely extending aperture 298. A bolt 299 with serrated lock washers 300 extends through the housing aperture 298 and through the aperture 293 of the underlying mounting block 288 and into nut 295. Upon suitably tightening bolt 299, against lock washers 300, the angular positions of optical units 204 and 206 can be maintained against accidental displacement.

Optical elements 212 and 214 are mounted to the floor pan 304 by means of angle brackets 305. A suitable fastener 307 retains each optical element 212 and 214 to the associated bracket in a condition of alignment with the companion optical element 204 and 206 on the gear shift lever 280, when the latter is in neutral.

Figure 4:
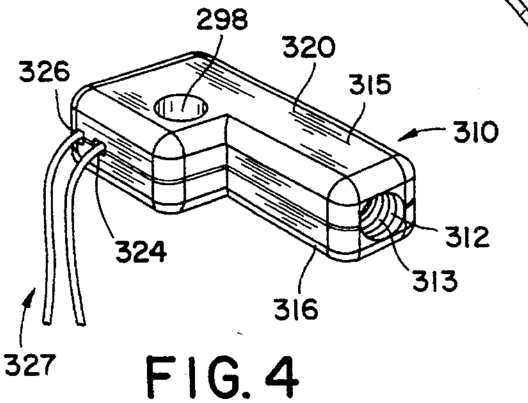
FIG. 4 (on the sheet of FIG. 2) is a perspective view of a housing in which is secured an optical element.

As better illustrated in FIG. 4, the housing 310 of each optical element 204, 206, 212 and 214 is made of a suitable rigid material, such as plastic, which is opaque to light within the working wavelength range of the system. The housing 310 has an internal cavity (not shown) for receiving the optical element. The cavity constitutes the terminal portion of a blind cylindrical light passage 312 which shapes the emerging radiant energy as a narrow beam. The light passage is provided with internal grooves 313 which extend generally transversely to the light propagation axis in order to scatter light reflected on the passage wall. This feature enhances the ability of the passage to focus the light beam. In the illustrated embodiment, the internal grooves take the form of a screw thread which may also be used for securing an alignment rod (not shown) to facilitate the mutual alignment between the element of an optical pair source/detector during the installation of the system.

The housing 310 may consist of two symmetrical plastic moulded halves 315, 316 held together along a parting plane extending longitudinally and centrally of the housing and of the longitudinal passage 312. A pair of small passages 324 and 326 are provided along the parting plane to allow clearance for the electrical conductors 327 of the optical element inside the housing 310.

Figure 5:
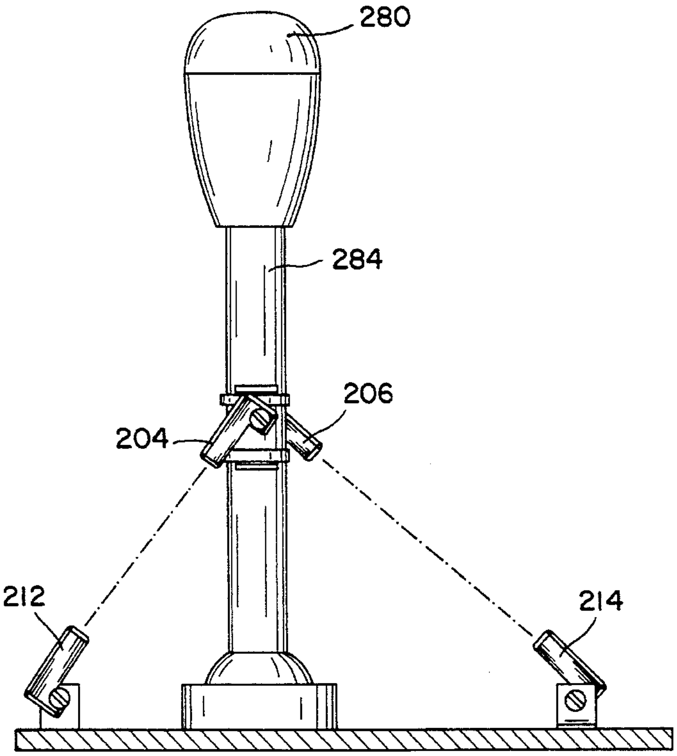
FIG. 5 is a side elevational view of the gear shift lever in neutral position, depicting the optical pairs in a condition of optical alignment.
Figure 6:
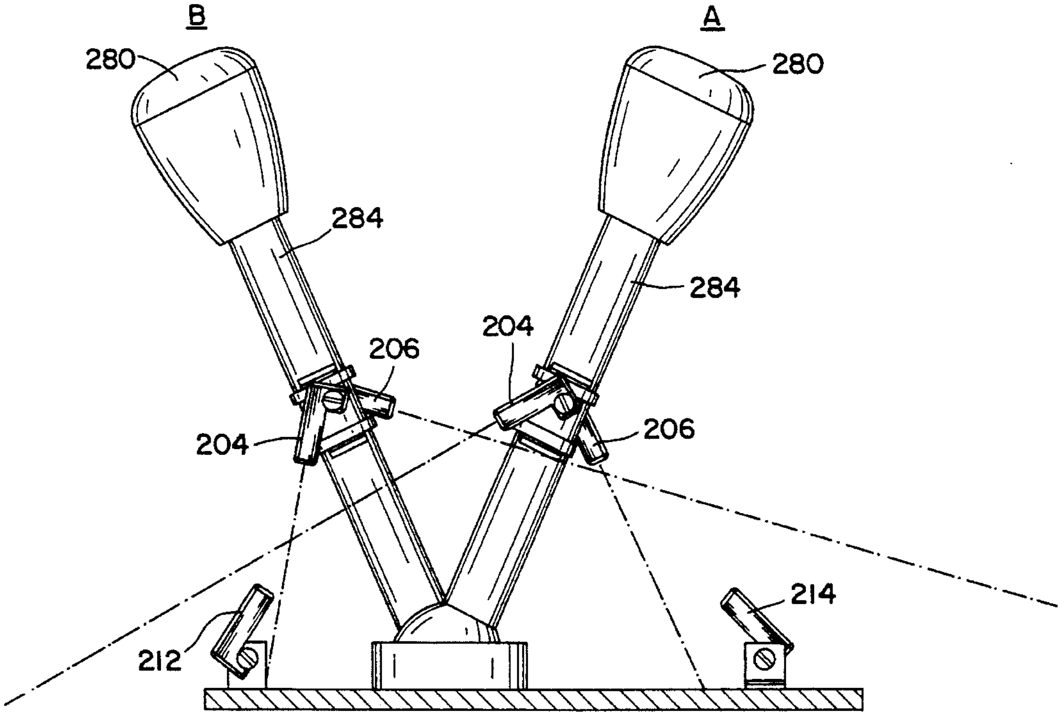
FIG. 6 is a side elevational view of the gear shift lever shown in two different non neutral positions, the optical pairs being no longer in alignment.

As illustrated in FIG. 5, when the gear shift lever 280 is in the neutral position, the elements of each optical pair source/detector are in mutual alignment along a light propagation axis (shown in dotted lines), hence in a condition of optical coupling. Stated otherwise, the sources 204 and 206 generate light within the respective fields of view of companion detectors 212 and 214. However, when the gear shift lever 280 is in any non-neutral position, as illustrated in FIG. 6, in the position A for example which corresponds to a first gear selection, the optical coupling between the elements of both optical pairs is terminated and neither light detector 212 and 214 will observe energy radiated from companion sources 204 and 206, respectively. Similarly, when the gear shift is brought to position B that corresponds to a second gear selection, no light is detected by either light detector 212 and 214.

Figure 7:
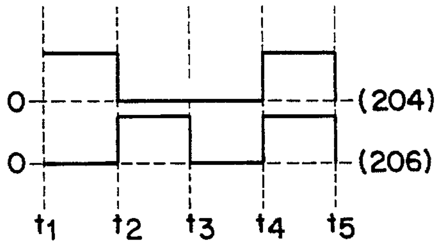
FIG. 7 (on the sheet of FIG. 2) is a diagram of the excitation signal applied to the light sources of the optical pairs during a diagnostic routine pass.
Figure 3:
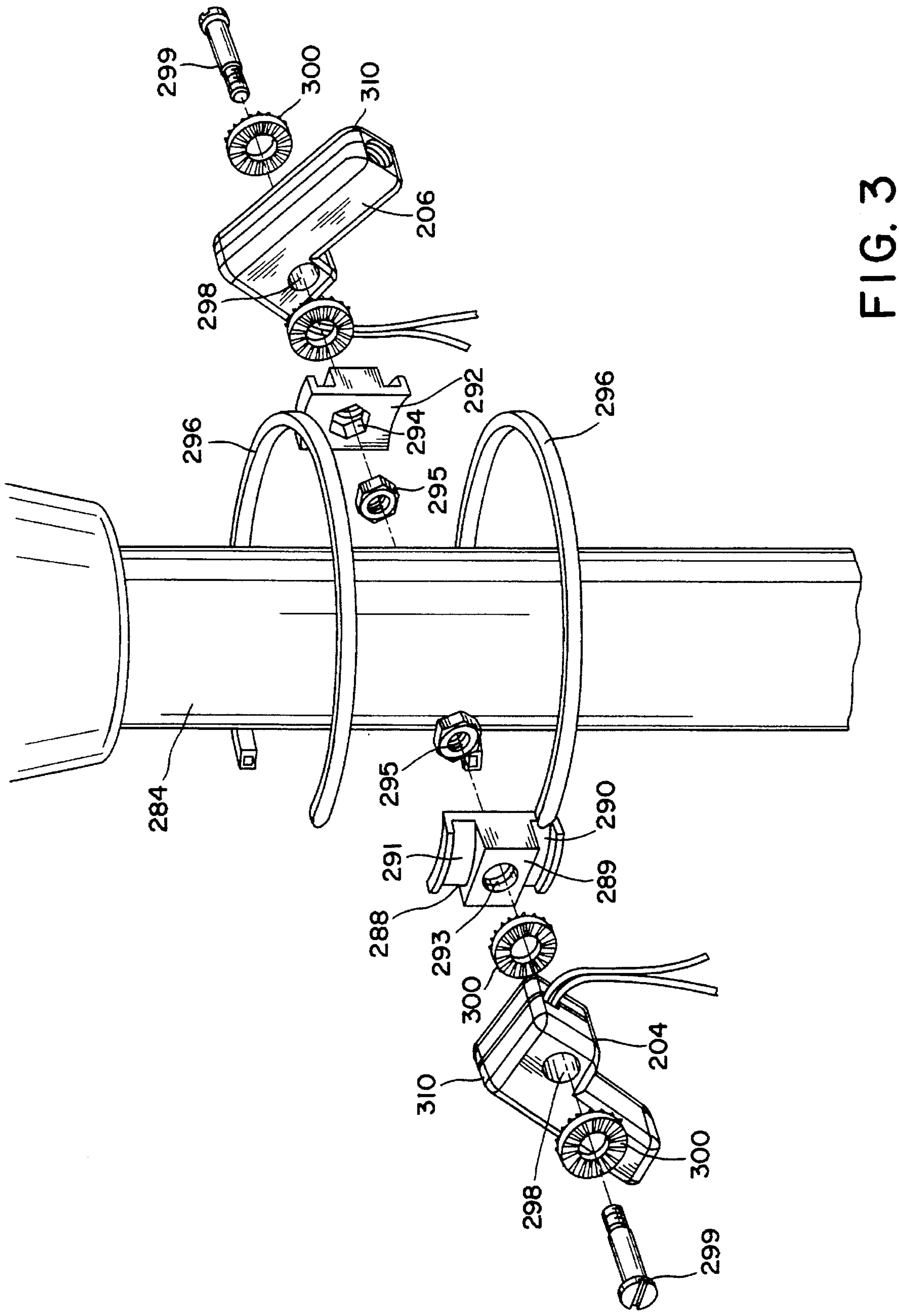
FIG. 3 is an exploded view showing two optical elements mounted to the intermediate region of the gear shift level.
Figure 8A:
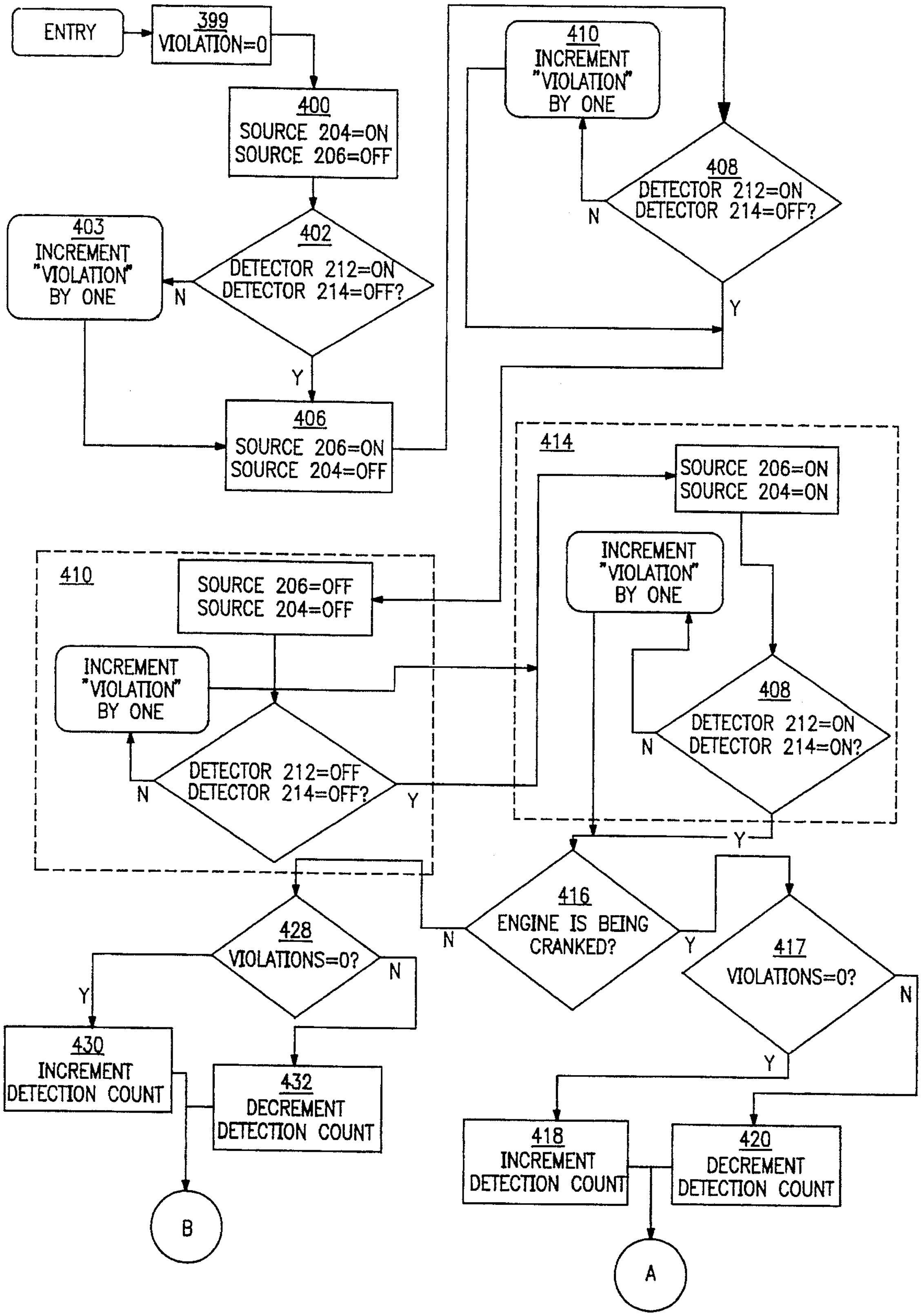
Figure 8B:
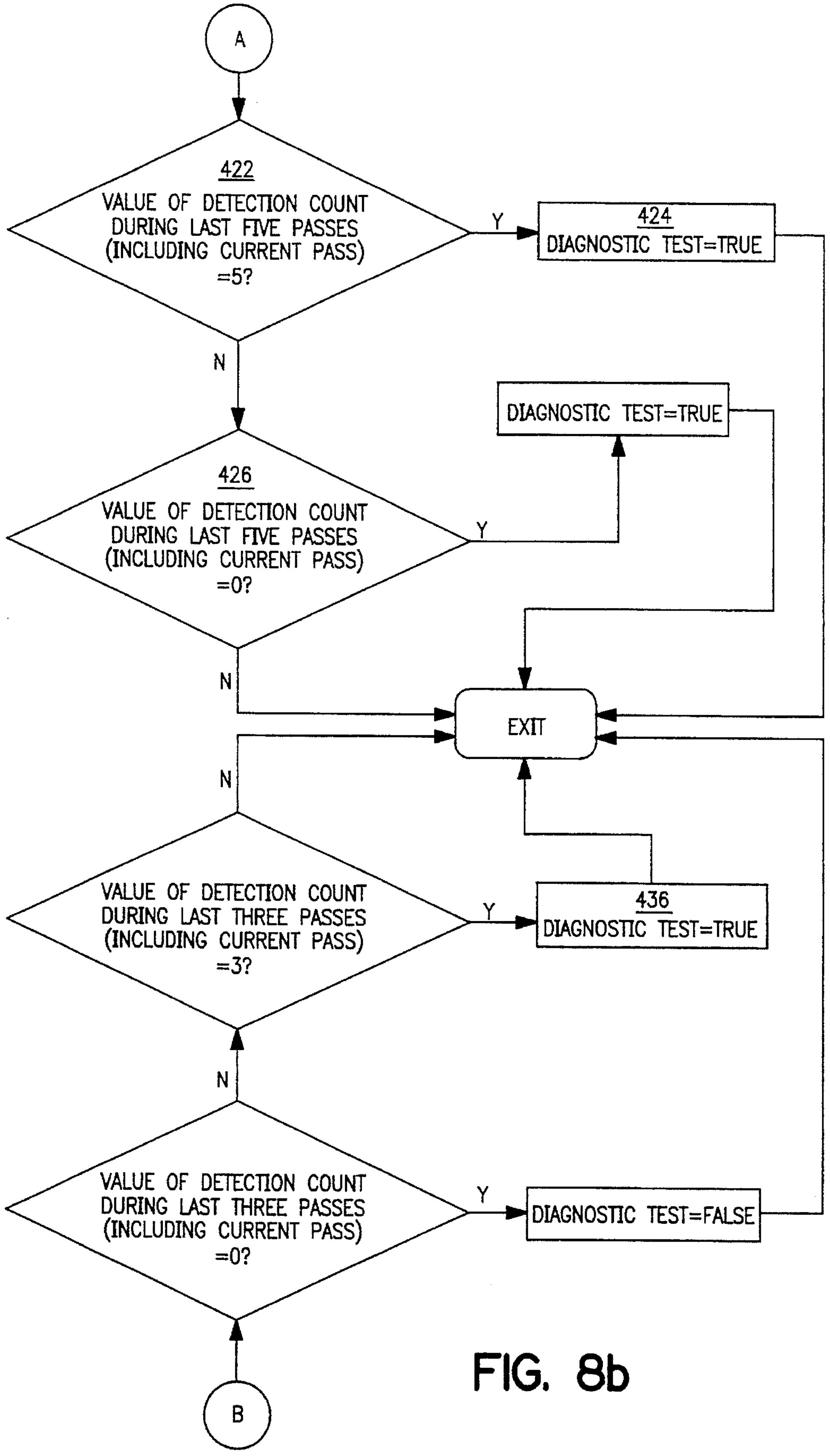

FIGS. 7 to 10 of the annexed drawings graphically illustrate the logical procedure implemented by the microprocessor 202 to determine if the engine of the vehicle can be safely started. An important element of the code executed by the microprocessor 202 is a diagnostic routine, best shown in FIG. 8, provided to detect occurrence of hardware events that should normally bar the starter interlock 200 from assuming the start enable condition. More specifically, the following hardware events are contemplated:

a) the gear shift lever 280 is in any non-neutral position; and b) a malfunction of the optical sensors array 201 or any associated circuitry such as drivers 208, 210 and comparators 216, 218.

In essence, the diagnostic routine excites the light sources 204 and 206 according to a predetermined sequence and monitors the response of the companion detectors 212 and 214, respectively. If the response pattern does not fit the excitation pattern, the diagnostic routine returns a value indicating that either one of the above hardware events has occurred.

The diagnostic routine begins with step 399 at which the value of the variable "violation" is set to zero (0). Next, at processing step 400, the microprocessor 202 energizes light source 204 for a duration of 2.5 milliseconds (ms) while maintaining source 206 off. At decision step 402 the response of detectors 212 and 214 is observed; only detector 212 should manifest an output. If this condition is not met the diagnostic routine increments the variable "violation" by one at step 403. However, if the response of the detectors matches the excitation pattern of the light sources, the variable "violation" is not incremented, thus retaining its default value of zero (0). At step (406) of the diagnostic routine the source 206 is triggered for 2.5 ms while the source 204 is off. Decision step 408 observes the response of detectors 212 and 214 and increments the variable "violation" at step 410 if a discrepancy in the detectors response is noted. The process sequences designated comprehensively by numerals 412 and 414 repeat the same test procedure as described above, this time for sources 204 and 206 set simultaneously off (sequence 412) and then set simultaneously on (sequence 414) for 2.5 ms. FIG. 7 illustrates the voltage with relation to time applied to the light sources 204 and 206 during the four-step test procedure. The following table correlates the operative states of the optical elements with relation to time intervals $t_1$, $t_2$, $t_3$, $t_4$, and $t_5$.

| Time interval | State of sources 204 and 206 |
|---|---|
| $t_1$–$t_2$ | 204 active<br>206 inactive |
| $t_2$–$t_3$ | 204 inactive<br>206 active |
| $t_3$–$t_4$ | 204 inactive<br>206 inactive |
| $t_4$–$t_5$ | 204 active<br>206 active |

The sequential excitation of the light sources 204 and 206 enables the program to conduct a dynamic test of the optical sensors array 201. What is meant by "sequential" is a signal voltage that causes a given light source to assume a sequence of operative states, namely an active state (generate light) during a first time frame and an inactive state (no light produced) during a second time frame. By monitoring the response of the companion detector for the predetermined excitation pattern, the program can sense malfunctions that may be otherwise difficult to detect. For instance, a malfunctioning detector that continuously outputs a high signal (normally indicative of light detection) may pass a rudimentary static test that simply observes the detector for some output activity, but will fail a dynamic check which verifies both operative states of the detector, namely the presence of output activity and the absence of output activity that should occur at predetermined instants in time.

Another interesting aspect of the four-step test is the cross-pair check conducted between elements that belong to different optical pairs (decision steps 402 and 408). This check will identify misaligned optical elements, for instance the source of one optical pair so skewed so as to produce light within the field of view of the detector belonging to the other pair, or a source that for some reason produces a broad light emission that registers on both detectors.

Upon completion of the four-step test, the program advances to decision step 416 which determines if the engine of the vehicle is being cranked. This is accomplished by observing the voltage impressed on starter input 225. The purpose of this conditional test is to select the criterion that will be applied in ascertaining whether the starter interlock should acquire the start enable state. If the starter motor is currently energized and is cranking the engine the program follows a processing thread that originates at decision step 417 provided for the purpose of evaluating the value of the variable "violation". If the value is zero (0), i.e. the probing of the optical sensors array 201 has returned a no-error condition, the value of a variable "detection count" is incremented at step 420. However if "violation"≠0, "detection count" is decremented at step 418. Decision step 422 evaluates the current value of "detection count" on the basis of the last five (5) passes of the diagnostic routine (including the current pass). If the last five (5) passes have returned "violation"=0, the program concludes that no hardware events exist that bar the engine from being remotely started and assigns the logical value "true" to a variable "diagnostic test" at step 424. If "detection count" has the value 1, 2, 3 or 4 "diagnostic test" retains the value it had before the call to the diagnostic routine run was made. The variable "diagnostic test" will be set to false only when "detection count" reaches zero (0).

It will be noted that when the starter motor is operating, the program is specifically designed to allow a comfortable margin for error. This is provided to compensate for temporary misalignments between the elements of the optical pairs that could result in a failed probing of the optical sensors array 201, due to vibrations of the shift linkage induced by the engine cranking. Only if the hardware is unable to satisfy at least one (1) out of five (5) runs, the program defaults the starter interlock 200 to a safer state by assigning the logical value "false" to the variable "diagnostic test".

Unlike the relaxed test applied when the engine is being cranked, a more rigorous standard is enforced in a case when the engine is not cranked. In this situation, the procedure is similar to the one described above in that the variable "detection count" is incremented (step 430) or decremented (step 432) in dependence of the value returned by the variable "violation". The major difference resides in the decision step 434 that causes the variable "diagnostic test" to acquire the value "true" (step 436) only if the probing of the sensors array 201 has consistently returned no violation during the last three passes. The variable "diagnostic test" acquires the value "false" (step 438) only when "detection count" has been depleted to zero (0).

As an example consider the following situation. A user, by remote control, attempts to start the engine of the vehicle. Assuming that the hardware is functioning properly and the transmission is in neutral, therefore when the command to crank the engine is implemented the variable "diagnostic test" is "true" and "detection count" has the value of three (3). When the actual cranking begins, the observation window of the diagnostic routine is extended to include the five (5) past runs. At this point no change in "diagnostic test" occurs since "detection count" contains three (3) credits. Any successful pass of the diagnostic routine will build-up the credit value to reach a maximum of five (5). On the other hand, should a call to the diagnostic routine return an error condition, due to vibration in the shift linkage, the number of credits is decremented to four (4), without causing, however, a change in "diagnostic test". The variable "diagnostic test" will be set to "false" only when five (5) consecutive passes have failed to return a no error condition.

FIG. 9 of the annexed drawings is a flowchart of a safety service routine that verifies the operative state of the parking brake and its interrelation with the shift linkage operation. This routine is provided as a further safety measure to prevent the engine from being cranked unless:

a) the parking brake is currently engaged; and b) a historical record of the parking brake operative state when correlated to the position of the shift linkage indicates no system malfunctions.

At step 440 of the safety service routine the program checks the current operative state of the parking brake by observing the voltage at microprocessor input 221. If the parking brake is disengaged the program proceeds to process step 442 which assigns to the variable "parking brake" the logical value "false". In essence, this amounts to defaulting the system to a state in which the engine if the vehicle is not allowed to start because a safety check failure has been reported.

If the parking brake if engaged the program execution continues with step 444 that will recall from memory data pertaining to the results of decision step 440 recorded during previous program passes. This data constitutes a historical record of the operative state of the parking brake. The program then compares the data with the results of decision step 440 during the current pass. If a change in the operative state of the parking brake is noted, namely the parking brake was previously disengaged and is now engaged, the program proceeds to decision step 446 which correlates the activity of the shift linkage to the recorded positions of the parking brake. In essence, the program keeps in memory the values of the variable "violation" returned at previous program passes. If "violation">0 before the change of position in the operative state of the parking brake was observed at step 444, which means that the gear shift lever was in a non-neutral position while the parking brake was disengaged, the program assigns at step 448 the logical value "true" to the variable "parking brake" to manifest a no-error condition.

The following practical situation would allow the program to reach step 448. First the vehicle is driven which requires to move the gear shift lever to a non-neutral position. As a result, the diagnostic routine will return "violation">0 while the parking brake is disengaged (also required in order to allow the vehicle to move). This satisfies step 446 of the safety service routine. Next, the vehicle is stopped and the parking brake is engaged, which satisfies steps 440, and 444 of the routine.

The safety service routine provides an additional layer of protection over the diagnostic routine described above and allows the engine to be cranked only if the parking brake is currently engaged and the activity observed at the parking brake switch 220 indicates a correctly functioning device.

The structure of the main program that operates the starter interlock 200 is depicted in FIG. 10. The program invokes the diagnostic and the safety service routines described earlier to determine if the engine can be safely started and in addition it performs a number of other verifications intended to initiate an emergency shut-down of the remote starting system if a major malfunction is detected.

The main program begins at step 450 which invokes the diagnostic routine. The results of the routine are evaluated at step 452. If the variable "diagnostic test" returns the value "true", which means that no violation has been detected during the execution of the routine, the main program then proceeds to step 454 that invokes the safety service routine to assess the operative state of the parking brake. Decision step 456 observes the value returned by the variable "parking brake". If, "true", the program proceeds to step 458 which generates an enabling signal on communication channel 207 authorizing the remote starting system to crank the engine. However, if either one of the diagnostic and the safety service routines have not been successfully passed, the program execution branches to step 460 that observes the electrical activity at the input 223 of the microprocessor 202 that is connected to the ignition circuit of the vehicle. Normally, the voltage impressed on input 223 should be nil since the starter interlock is in the starter disable condition. Still, if as a result of a malfunction, the remote starting system attempts to override the starter interlock 200, and actuates the ignition circuit preparatory to the actual engine cranking, the program proceeds to step 462 to open the normally opened relay by de-energizing the microprocessor output 237. This action has the effect of abruptly cutting off the power supply to relays 104, 106 and 108 that energize the starter, ignition, fuel injection, etc.

At step 462 the program assesses the effect of setting the relay 236 in the opened (non conduction) state. If the relay has functioned properly, the voltage across inputs 241 and 243 should be equal to the power supply voltage, namely +12 V. However, if voltage no voltage is present, the program assumes that the attempt to deprive the relays 104, 106 and 108 with electric power has been unsuccessful (the relay 236 is still closed) and immediately initiates at step 464 an emergency shut-down. The procedure consists of injecting a small current in the gate terminal of thyristor 229 in order to set the thyristor in conduction and short circuit the power supply to ground. The result of this action is to cause the fuse or breaker installed in the power supply line 228 to open and permanently disable the remote starting system 100 and the starter interlock 200.

The main program described above is continuously executed by the microprocessor 202. Hence, the information as to wether the engine of the vehicle can be safely started is available at all times to the remote starting system 100. An important parameter of the program regulating the operation of the remote starting system 100 is to consider the operative state of the starter interlock 200 prior to initiating the engine cranking cycle. If no enabling command is issued on communication line 102 by the microprocessor 202, no cranking of the engine is made. It should also be mentioned that should the enabling command be discontinued after the cranking cycle is initiated the micro-controller 102 is programmed to immediately abort the attempt of starting the engine by de-energizing the starter motor.

The above description of a preferred embodiment should not be interpreted in any limiting manner since variations and refinements are possible without departing from the spirit of the invention. The scope of the invention is limited by the terms of the following claims and their equivalents.

We claim:

1. An opto-electric interlock to prevent remote starting of a motor vehicle when a transmission of the vehicle establishes a driving relationship between an engine of the vehicle and a wheel thereof, said opto-electric interlock comprising:

a light source for supplying radiant energy;

a light detector responsive to radiant energy incoming from said light source, said light source and said light detector assuming a state of optical coupling in response to movement of a shift linkage of the transmission of the vehicle to a spacial position in which the driving relationship between the engine of the vehicle and the wheel thereof is terminated, whereby an output condition of said light detector enables to determine whether the transmission of the vehicle is in gear;

a processing unit controlling actuation of said light source, said processing unit being responsive to the output condition of said light detector in order to assume either one of a start enable state and a starter disable state, in said start enable state said processing unit enabling remote actuation of a starter motor of the vehicle, in said starter disable state said processing unit precluding remote actuation of the starter motor, whereby said processing unit is capable of switching between said start enable state and said starter disable state in dependence of said spacial position of the shift linkage, said processing unit including diagnosis means for sensing detectable malfunctions in said opto-electric interlock, said diagnosis means including:

a) an excitation unit for actuating said light source in a predetermined manner;

b) means for observing the output condition of said light detector;

c) a comparing unit for comparing the output condition of said light detector observed at step b) with a response characteristic of the opto-electric interlock in an unimpaired operative condition, upon absence of agreement between the output condition at step b) and said response, said processing unit assuming said starter disable state in order to preclude remote actuation of the starter motor of the vehicle.

2. An opto-electric interlock as defined in claim 1, wherein said excitation unit causes said light source to assume a sequence of operative states at predetermined instants in time.

3. An opto-electric interlock as defined in claim 2, wherein one of said operative states is actuation of said light source to cause said light source to emit radiant energy during a first time interval.

4. An opto-electric interlock as defined in claim 3, wherein the other of said operative states is de-actuation of said light source, whereby said light source generates no radiant energy during a second time interval.

5. An opto-electric interlock as defined in claim 4, wherein said processing unit is capable of assuming said starter disable state unless said light detector manifests:

a) an output condition during said first time interval indicative of presence of radiant energy; and b) an output condition during said second time interval indicative of absence of radiant energy.

6. An opto-electric interlock as defined in claim 1, comprising:

first and second light sources for supplying radiant energy;

first and second light detectors responsive to radiant energy incoming from said first and second light sources, respectively, said excitation unit actuating said first and second light sources in a predetermined manner.

7. An opto-electric interlock as defined in claim 6, wherein said excitation unit causes actuation of said first and second light sources at different instants in time.

8. An opto-electric interlock as defined in claim 7, wherein said processing unit is capable of assuming said starter disable state when either one of conditions a and b are met:

a) said first light detector manifests:

an output condition indicative of presence of radiant energy when said first light source is de-actuated and said second light source is actuated; and b) said second light detector manifests:

an output condition indicative of presence of radiant energy when said second light source is de-actuated and said first light source is actuated.

9. An opto-electric interlock as defined in claim 7, wherein said processing unit is capable of assuming said starter disable state when either one of said first and second detector manifests an output condition indicative of presence of radiant energy when said first and second light sources are de-actuated.

10. An opto-electric interlock as defined in claim 7, wherein said processing unit is capable of assuming said starter disable state when either one of said first and second detector manifests an output condition indicative of absence of radiant energy when said first and second light sources are actuated.

11. An opto-electric interlock to prevent remote starting of a motor vehicle when a transmission of the vehicle establishes a driving relationship between an engine of the vehicle and a wheel thereof, said opto-electric interlock comprising:

a light source for supplying radiant energy;

a light detector responsive to radiant energy incoming from said light source, said light source and said light detector assuming a state of optical coupling in response to movement of a shift linkage of the transmission of the vehicle to a spacial position in which the driving relationship between the engine of the vehicle and the wheel thereof is terminated, whereby an output condition of said light detector enables to determine whether the transmission of the vehicle is in gear;

a processing unit controlling actuation of said light source, said processing unit including an excitation unit for causing said light source to assume a sequence of operative states at predetermined instants in time, a first of said operative states corresponding to actuation of said light source to cause said light source to emit radiant energy during a first time interval, a second of said operative states corresponding to de-actuation of said light source, whereby said light source generates no radiant energy during a second time interval, said processing unit being responsive to the output condition of said light detector in order to assume either one of a start enable state and a starter disable state, in said start enable state said processing unit enabling remote actuation of a starter motor of the vehicle, in said starter disable state said processing unit precluding remote actuation of the starter motor, whereby said processing unit is capable of switching between said start enable state and said starter disable state in dependence of the spacial position of the shift linkage, said processing unit assuming said start enable state when said light detector manifests:

a) an output condition during said first time interval indicative of presence of radiant energy; and b) an output condition during said second time interval indicative of absence of radiant energy.

12. An opto-electric interlock as defined in claim 11, comprising:

first and second light sources for supplying radiant energy;

first and second light detectors responsive to radiant energy incoming from said first and second light sources, respectively, said excitation unit actuating said first and second light sources in a predetermined manner.

13. An opto-electric interlock as defined in claim 12, wherein said excitation unit causes actuation of said first and second light sources at different instants in time.

14. An opto-electric interlock as defined in claim 13, wherein said processing unit assumes said starter disable state in occurrence of either one of conditions a and b:

a) said first light detector manifests:

an output condition indicative of presence of radiant energy when said first light source is de-actuated and said second light source is actuated; and b) said second light detector manifests:

an output condition indicative of presence of radiant energy when said second light source is de-actuated and said first light source is actuated.

15. An opto-electric interlock as defined in claim 12, wherein said processing unit is capable of assuming said starter disable state when either one of said first and second detectors manifests an output condition indicative of absence of radiant energy when said first and second light sources are actuated.

16. An opto-electric interlock as defined in claim 11, wherein said excitation unit causes said light source to assume said sequence of said operative states in repetition.

17. An opto-electric interlock as defined in claim 16, wherein said processing unit assumes said start enable state when said detector successively responds with said output conditions indicative of the presence or absence of radiant energy to a plurality of sequences of said operative states.

18. An opto-electric interlock as defined in claim 17, wherein said processing unit includes an input for receiving a signal indicative of an operative state of a starter motor of said vehicle, in response to said signal said processing unit assuming either one of a first and second test modes for assessing whether the transmission of the vehicle is in gear, said processing unit acquiring said first test mode when said signal indicates that the starter motor of the vehicle is operating to crank the engine thereof and said second test mode when said signal indicates that the starter motor of the vehicle is inactive, i) under said first test mode said processing unit switching to said starter disable state when said detector fails to respond with the output conditions a) and b) 11 to X successive sequences of said operative states, ii) under said second test mode said processing unit switching to said starter disable state when said detector fails to respond with the output conditions a) and b) of to Y successive sequences of said operative states.

19. An opto-electric interlock as defined in claim 11, wherein said processing unit comprises an input for receiving a signal indicative of an operational state of a parking brake of the vehicle, said processing unit assuming said starter disable state in response to said signal when said signal indicates that the parking brake is released.

20. An opto-electric interlock as defined in claim 11, wherein said radiant energy is light in the infrared range of the spectrum.

21. An opto-electric interlock as defined in claim 11, wherein said processing unit comprises an input for receiving an input signal representative of a state of conduction of an electric circuit of the vehicle, the electric circuit acquiring a closed state preparatory to enrgization of the starter motor of the vehicle, said processing unit further comprising an output for generating an output signal for controlling a state of conduction of an electric circuit effecting energization of the starter motor of the vehicle, in response to said input signal indicating that the electric circuit of the vehicle assumes the closed state, said processing unit when in said starter disable state outputting said output signal to prevent energization of the starter motor of the vehicle.

22. An opto-electric interlock as defined in claim 21, wherein said output signal drives a power switch in series with the electric circuit effecting energization of the starter motor of the vehicle.

23. An opto-electric interlock as defined in claim 12, wherein said processing unit is capable of assuming said starter disable state when either one of said first and second detectors manifests an output condition indicative of presence of radiant energy when said first and second light sources are de-actuated.

24. An interlock to prevent remote starting of a motor vehicle when a transmission of the vehicle establishes a driving relationship between an engine of the vehicle and a wheel thereof, said interlock comprising:

first sensor means responsive to movement of a shift linkage of the transmission, whereby an output condition of said sensor means allows to determine if the transmission of the vehicle is in gear;

second sensor means responsive to an operative condition of a parking brake of the vehicle, whereby an output condition of said second sensor means enables to determine whether the parking brake is released or applied;

a processing unit coupled to said first and second sensor means, said processing unit being capable of assuming either one of a start enable state and a starter disable state in dependence upon the output conditions of said first and second sensor means, in said start enable state said processing unit enabling remote actuation of a starter motor of the vehicle, in said starter disable state said processing unit precluding remote actuation of the starter motor, said processing unit including memory means for storing data representative of the output condition of said first sensor means when the output condition of said second sensor means indicates that the parking brake is released, said processing unit assuming said start enable state in response to:

a) a current output condition of said second sensor means indicates that the parking brake is applied;

b) a current output condition of said first sensor means indicates that the driving relationship between the engine of the vehicle and the wheel thereof is terminated; and c) a contents of said memory means indicates occurrence of a driving relationship between the engine of the vehicle and the wheel thereof.

25. An interlock as defined in claim 24, wherein said first sensor means comprises:

a light source for supplying radiant energy;

a light detector responsive to radiant energy incoming from said light source, said light source and said light detector assuming a state of optical coupling in response to movement of a shift linkage of the transmission of the vehicle to a spacial position in which the driving relationship between the engine of the vehicle and the wheel thereof is terminated.

26. An interlock as defined in claim 25, wherein said processing unit including an excitation unit for causing said light source to assume a sequence of operative states at predetermined instants in time, a first of said operative states corresponding to actuation of said light source to cause said light source to emit radiant energy during a first time interval, a second of said operative states corresponding to de-actuation of said light source, whereby said light source generates no radiant energy during a second time interval, said processing unit assuming said start enable state when said light detector manifests:

a) an output condition during said first time interval indicative of presence of radiant energy; and b) an output condition during said second time interval indicative of absence of radiant energy.

27. An interlock as defined in claim 25, wherein said radiant energy is light in the infrared range of the spectrum.

28. A group of opto-electric components for detecting a position of a gear shift lever in a motor vehicle, said group of opto-electric components comprising:

a light source element for generating radiant energy;

a light detector element responsive to the radiant energy emitted by said light source element, said light source element and said light detector element being mounted in respective housings, a first one of said housings being capable of engaging the gear shift lever, whereby movement of the gear shift lever causes movement of said first housing and the element mounted therein, a second one of said housings being adapted for mounting to a location adjacent the gear shift lever, whereby movement of the gear shift lever causes a relative movement between said light source element and said light detector element, said light source element and said light detector elements being capable of assuming a state of optical coupling when the gear shift lever is in a predetermined position in which said light source element generates light within a field of view of said light detector element, in said state of optical coupling said light detector element manifesting an output condition indicative of presence of radiant energy which signals that the gear shift lever is in the predetermined position.

29. A group of opto-electric components as defined in claim 28, wherein each said housing comprises:

a body of material substantially opaque to said radiant energy;

an elongated light passage formed in said body for receiving therein one of said elements in a recessed condition relative an opening of said light passage.

30. A group of opto-electric components as defined in claim 29, wherein said light passage is provided with internal grooves extending generally transversely to a light propagation path through said passage, said grooves constituting means for scattering light reflected on an internal wall of said light passage.

31. A group of opto-electric components as defined in claim 29, wherein said first housing comprises a gear shift lever mounting member, said member including a recessed surface conforming to an outer face of the gear shift lever.

32. A group of opto-electric components as defined in claim 31, wherein said recessed surface is concave.

33. A group of opto-electric components as defined in claim 31, wherein said first housing comprises an aperture for receiving a fastener releasably joining said first housing and said gear shift lever mounting member.

34. A group of opto-electric components as defined in claim 31, wherein said gear shift lever mounting member includes a groove for receiving a tie wrap for encircling the gear shift lever and maintaining said mounting member against the gear shift lever.

35. A group of opto-electric components as defined in claim 31, wherein said recessed surface is coated with adhesive to bond said mounting member to the gear shift lever.

36. A group of opto-electric components as defined in claim 28, comprising:

a first pair of optical elements including a light source element and a light detector element; and a second pair of optical elements including a light source element and a light detector element, one element of each said first and second pairs of optical elements being adapted for mounting to the gear shift lever of the vehicle.

37. A group of opto-electric components as defined in claim 28, wherein said light source element is a light emitting diode capable of generating light in the infrared range of the spectrum.

38. A group of opto-electric components as defined in claim 37, wherein said light detector element is a phototransistor responsive to infrared radiation.

* * * * *